United States Statutory Invention Registration [19]

[11] Reg. Number: H998

Gerharz [43] Published: Dec. 3, 1991

[54] PEST DISLODGEMENT BY ELECTROMAGNETIC FIELDS

[76] Inventor: Reinhold Gerharz, 8703 Burdette Rd., Bethesda, Md. 20034

[21] Appl. No.: 398,569

[22] Filed: Aug. 25, 1989

[51] Int. Cl.[5] ..... A01M 1/22; H05C 3/00

[52] U.S. Cl. ..... 43/124; 116/22 A

[58] Field of Search ..... 366/222; 367/139; 361/159, 232; 340/384 E; 335/219, 299; 307/326, 104; 204/157.15; 116/22 A; 43/98, 124, 143

[56] References Cited

U.S. PATENT DOCUMENTS

| | | | |
|---|---|---|---|
| 4,097,838 | 6/1978 | Fiala | 367/139 |
| 4,802,057 | 1/1989 | Patterson et al. | 361/232 |
| 4,870,779 | 10/1989 | Johnson et al. | 116/22 A |

*Primary Examiner*—Bernarr E. Gregory

[57] ABSTRACT

A method and apparatus for effecting the dislodgement of pests including the placement of a field generating mechanism, in an infested area whereby a magnetic or electric field may be applied to induce irritation and neurotic discomfort to the pests causing them to vacate that particular area.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

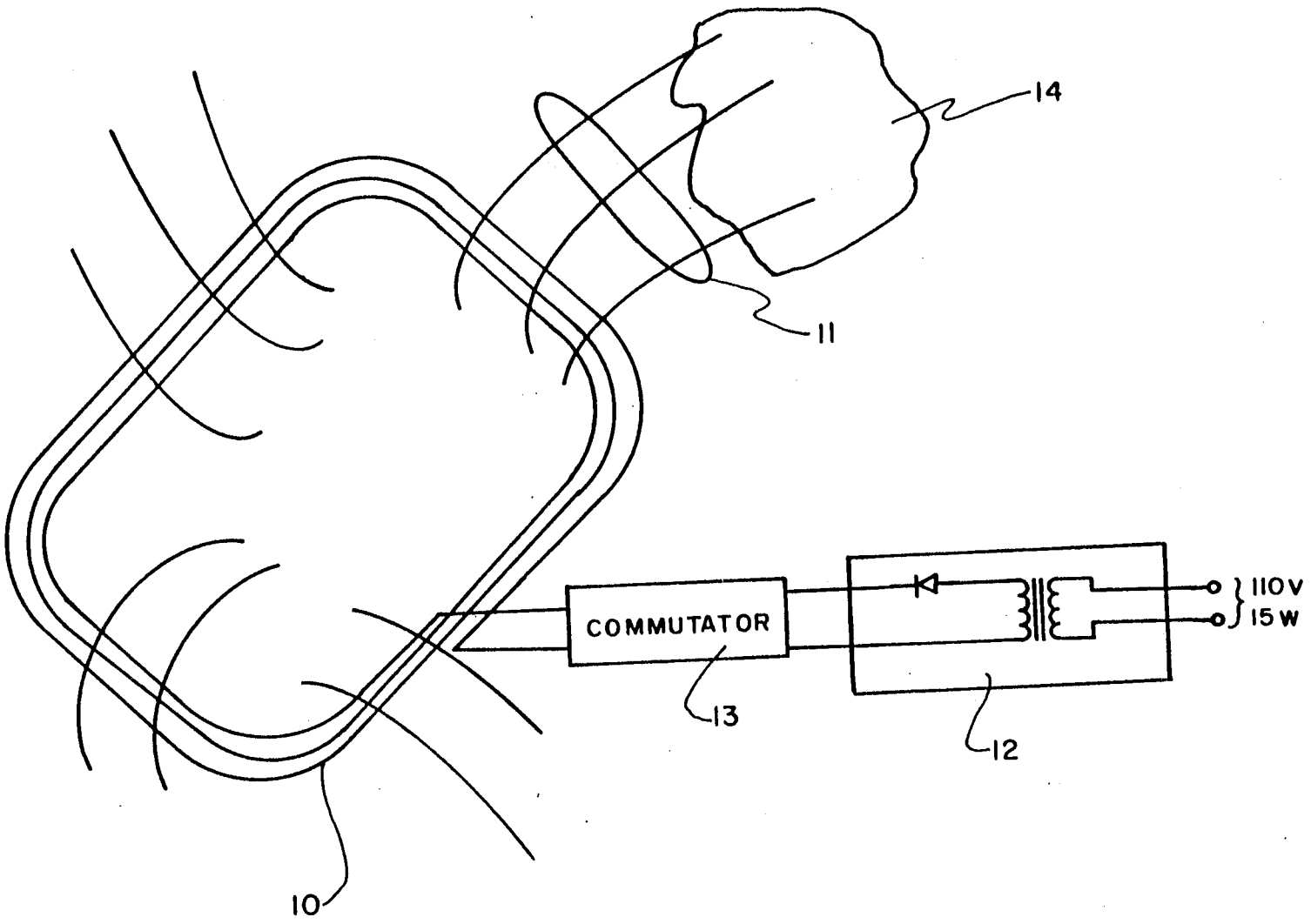
110V
15W
12
COMMUTATOR
13
14
11
10

PEST DISLODGEMENT BY ELECTROMAGNETIC FIELDS

The invention described herein may be manufactured, used, and licensed by the U.S. Government for governmental purposes without the payment of any royalties thereon.

BACKGROUND OF INVENTION

1. Field

This invention relates to a method and apparatus for controlling pest infestations and more particularly to the utilization of an electro magnetic field to nondestructively dislodge and relocate said pests.

2. Prior Art

A number of different techniques have been used in the past to rid an area of pest infestation, but in each instance there were objectionable consequences which were not generally acceptable. There are occasions where the normally used techniques of controlling pests simply cannot be effectively applied, such as in health facilities or heavily congested areas. The most prevalent means of controlling pests lies in the spreading of toxic materials, the dissipation of sonic irradiation and exposure to high-frequency electromagnetic signals or to saturating the infested areas with particle beams. All of these methods tend to unbalance the bio-chemistry of the locale, disturb the immediate areas of the human habitat or cause undue pollution of the natural environment by the fumes, chemicals or noises used. All these techniques require the use of materials or instruments that are dangerous to handle and quite often expensive to obtain. The present invention overcomes the prior art disadvantages of repeated fumigations, disposal of toxic waste materials, handling unsafe materials and the necessity for extensive training for the operators by using a technique of steadily applying and carefully controlling the exposure times of magnetic fields of particular characteristics to the infested areas. These features may be varied by automated means in accordance with the needs of each individually infested area and the specific type of pests involved.

A number of advantages accrue from the use of this technique, including the elimination of a need for fumigation or the physical application of toxic materials, as well as the elimination of the need to locate the center of pest infestation. The components used in fabricating the field producing means is quite inexpensive and provides for clean operation. This invention is also conducive to self-installment by property owners and eliminates the need for repeated visits by professional pest exterminators while lending itself to simplified home-servicing of all involved components of the system. It is totally environmentally safe and has absolutely no adverse effects on humans.

SUMMARY OF THE INVENTION

The general purpose of this invention is to provide a safe, inexpensive and effective means for ridding an infested area of pests by the application of magnetic or electric fields to the general locale of the infested area to effect the dislodgement and migration of the pests therefrom. The specific pests for which this apparatus has been found particularly effective are ants, termites, roaches, rodents and certain kinds of birds.

Most arthropods and some classes of rodents and pigeons have organs that are sensitive to the earth magnetic field and use this field for orientation or homing. Disturbing the functioning of these organs by superimposing different magnetic field components, and by modulating their amplitude, introduces in these animals discomfort, restlessness and neurotic agitation. The result is a desire for a more stable environment. Animal pest hearths that are located within the human domestic habitat may therefore be remotely disturbed with the proper superimposition of a changeable magnetic field.

BRIEF DESCRIPTION OF THE DRAWING

The single FIGURE shows a simple circuit arrangement for generating a magnetic field for saturating a pest infected area.

DESCRIPTION OF THE PREFERRED EMBODIMENT

The preferred embodiment of this invention is depicted in the drawing and in its simplest form consists of a coil for generating a magnetic field and a power supply for driving the coil. It has been found in the area of animal physiology that magnetic perturbations can effect insect metabolism and the homing organs of certain higher animals. It has also been found that rapid changes by weak magnetic field intensities, especially those that fall within the frequency domain of animatic organs (such as the heart beat, breathing rate or the corresponding neuron velocity within peculiar limb sections of the animal) can influence the animals behavior patterns. These changes will subject the animals to persistent and no longer tolerable irritation, which might initiate their eventual migration elsewhere.

The coil arrangement of the drawing may be used to generate a magnetic field at a convenient location near the pests abode. In most applications, the field intensity of the superimposed field will not need to exceed that of the natural earth magnetic field, although its direction must be different when application is intended. Continuous application of the changing field is not necessary. Automated means, such as time switches, may suffice for the activation during desired times of the day, or for inducing varying amplitude functions of the superimposed field components.

The artificial fields may be easily generated with one or several rotating permanent magnets, but more versatile methods are achieveable with the use of coils, as shown in the figure. The use of static field generators are also envisioned as being mounted in the open to rotate with the wind. The magnetic moment of such a device should have a typical value of about 100 Ampere meters$^2$.

A typical application of the invention is shown with an open air Helmholtz coil 10 of quadratic form and of approximately 1 square meter cross section, wound with 250 turns of a 1 mm diameter copper wire. In the experimental circuit shown, an ordinary automobile battery charger 12 of 60 Hz a.c. is used to power the coil with one-way rectified, but unfiltered, direct current of 0.5 A at 10 V. The magnitude of the magnetic moment (Ampere turns$\times$area) of the excited coil was estimated to be about $M=125$ Am$^2$; it was reversed every week with a commutator switch 13. The presence of the coil's magnetic field was detectible with a simple compass up to a distance of 5 meters from the coil. The coil was positioned near the suspected formicary and remained there through most of the animals' foraging period during the months of June through August.

It has been found that this apparatus can be effectively used within the living quarters of one's home as well as in outbuildings, such as cribs and barns, with no deleterious effect to the inhabitants or domestic pets.

One very interesting aspect of this invention is that it can be cleverly disguised and integrated into the walls, ceilings, floors, furniture or accessories in the home. For instance, the coil could be placed on the back side of a picture frame, or actually integrated into the frame without adverse effects to the environment, and thus be attractive as well as useful and functional addition thereto.

I claim:

1. An apparatus for saturating a pest infested area with an electromagnetic field, comprising:

an open air coil placed in proximity to a pest infested area;

means for effecting a d.c. current flow in said coil, whereby an electromagnetic field is generated having an intensity in accordance with the number of turns on the coil and the current flow therethrough.

2. The apparatus of claim 1, having commutator means coupled to the coil and current means for selectively changing the direction of the flow of current through the coil.

3. A method of dislodging pests from an infested area, including the steps of:

applying a magnetic field to the pest infested area and orienting said field in a direction which is out of phase with the earth's magnetic field.

4. An apparatus for saturating a pest infested area with a magnetic field, comprising:

a static magnetic field means for generating a magnetic field of an intensity sufficient to saturate a pest infested area;

means for applying said magnetic field to a pest infected area;

means for orienting said magnetic field, relative to the pest infested area, for maximum application of said magnetic field.

* * * * *